United States Patent
Huffman et al.

(10) Patent No.: US 8,151,311 B2
(45) Date of Patent: Apr. 3, 2012

(54) SYSTEM AND METHOD OF DETECTING POTENTIAL VIDEO TRAFFIC INTERFERENCE

(75) Inventors: James Huffman, Kansas City, MO (US); Douglas Medina, Grain Valley, MO (US); Darren Kaufman, Olathe, KS (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1159 days.

(21) Appl. No.: 11/948,694

(22) Filed: Nov. 30, 2007

(65) Prior Publication Data

US 2009/0144791 A1 Jun. 4, 2009

(51) Int. Cl.
*H04N 7/173* (2011.01)
*H04N 7/16* (2011.01)
*H04B 15/00* (2006.01)

(52) U.S. Cl. ........ 725/107; 725/126; 725/144; 455/63.1

(58) Field of Classification Search .................. 725/107, 725/124, 125
See application file for complete search history.

(56) References Cited

U.S. PATENT DOCUMENTS

| | | | |
|---|---|---|---|
| 6,118,975 A * | 9/2000 | Bowyer et al. ................ 725/107 |
| 6,813,485 B2 | 11/2004 | Sorrells | |
| 6,965,816 B2 | 11/2005 | Walker | |
| 6,968,364 B1 | 11/2005 | Wong | |
| 7,070,110 B2 | 7/2006 | Lapstun | |
| 7,082,106 B2 | 7/2006 | Sharma | |
| 7,082,141 B2 | 7/2006 | Sharma | |
| 7,089,099 B2 | 8/2006 | Shostak | |
| 7,092,406 B2 | 8/2006 | Sharma | |
| 7,097,106 B2 | 8/2006 | Silverbrook | |
| 7,103,460 B1 | 9/2006 | Breed | |
| 7,150,398 B2 | 12/2006 | Silverbrook | |
| 7,159,777 B2 | 1/2007 | Silverbrook | |
| 7,188,769 B2 | 3/2007 | Silverbrook | |
| 7,243,849 B2 | 7/2007 | Lapstun | |
| 7,395,548 B2 * | 7/2008 | Runzo ........................... 725/107 |
| 8,032,086 B2 * | 10/2011 | Waltho et al. ................ 455/63.1 |
| 2003/0093187 A1 | 5/2003 | Walker | |
| 2003/0110503 A1 | 6/2003 | Perkes | |
| 2004/0045030 A1 | 3/2004 | Reynolds | |
| 2004/0073937 A1 * | 4/2004 | Williams ....................... 725/107 |
| 2005/0187677 A1 | 8/2005 | Walker | |
| 2005/0192727 A1 | 9/2005 | Shostak | |
| 2005/0273218 A1 | 12/2005 | Breed | |
| 2006/0025897 A1 | 2/2006 | Shostak | |

(Continued)

OTHER PUBLICATIONS

White Spaces Coalition, www.wikipedia.org, Aug. 17, 2007 (2 pgs).

(Continued)

*Primary Examiner* — Kristine Kincaid
*Assistant Examiner* — Chris Parry
(74) *Attorney, Agent, or Firm* — Tole Law Group, PC

(57) ABSTRACT

A method of detecting potential video traffic interference at a video head-end of a video distribution network is disclosed and includes detecting, at a video head-end, a signal populating an ultra high frequency (UHF) white space frequency. The method also includes determining that a strength of the signal is equal to or greater than a threshold signal strength. Further, the method includes sending an alert from the video head-end to a network management system. The alert indicates that the UHF white space frequency is populated by a signal having a potential to interfere with video traffic delivered via the video head-end.

22 Claims, 6 Drawing Sheets

U.S. PATENT DOCUMENTS

| | | | |
|---|---|---|---|
| 2006/0193295 | A1 | 8/2006 | White |
| 2006/0206246 | A1 | 9/2006 | Walker |
| 2006/0238877 | A1 | 10/2006 | Ashkenazi |
| 2007/0088553 | A1 | 4/2007 | Johnson |
| 2007/0124144 | A1 | 5/2007 | Johnson |
| 2007/0139200 | A1 | 6/2007 | Yushkov |
| 2008/0233946 | A1* | 9/2008 | Henry ........................ 455/422.1 |
| 2009/0124205 | A1* | 5/2009 | Aboba et al. ................. 455/63.1 |

OTHER PUBLICATIONS

Eric Bangeman, The White Spaces Coalition's plans for fast wireless broadband—the technology, Ars Technica, www.arstechnica.com, Apr. 17, 2007, (2 pgs).

Eric Bangeman, The White Spaces Coalition's plans for fast wireless broadband—Fast broadband without fiber . . . or even wires, Ars Technica, www.arstechnica.com, Apr. 17, 2007, (2 pgs).

Steven K. Jones, Thomas W. Phillips, Initial Evaluation of the Performance of Prototype TV-Band White Space Devices, OET Report—FCC/OET 07-TR-1006, Office of Engineering and Technology, Federal Communications Commission, Jul. 31, 2007, (85 pgs).

Stephen R. Martin, Direct-Pickup Interference Tests of Three Consumer Digital Cable Television Receivers Available in 2005, OET Report—FCC/OET 07-TR-1005, Office of Engineering and Technology, Federal Communications Commission, Jul. 31, 2007, (28 pgs).

Paul Henry, Systems and Methods of Wireless Communication, U.S. Patent Appl. No. 11/863,491, filed Sep. 28, 2007.

* cited by examiner

SYSTEM AND METHOD OF DETECTING POTENTIAL VIDEO TRAFFIC INTERFERENCE

FIELD OF THE DISCLOSURE

The present disclosure is generally related to detecting potential interference with video traffic delivered via a video distribution network.

BACKGROUND

Wireless regional area networks (WRANs) and other emerging technologies have the potential to cause interference (e.g., desensitization interferences) with digital television channels delivered via video head-ends and other components of video distribution networks. Such technologies emit signals using vacant ultra high frequency (UHF) television frequencies (white spaces). The signals can spill over into active digital television channels and cause picture and audio impairments. Moreover, when spectral spillover occurs, tuners on the active channels, as well as adjacent channels and other channels, can overload, causing pixilation and freezing of video and audio. Hence, there is a need for a system and method of detecting potential video traffic interference.

DETAILED DESCRIPTION OF THE DRAWINGS

A system to detect potential video traffic interference at a video head-end of a video distribution network is disclosed and includes a detection system having processing logic and memory accessible to the processing logic. The memory includes instructions executable by the processing logic to determine that a strength of a detected signal populating an ultra high frequency (UHF) white space frequency is equal to or greater than a threshold signal strength. The memory also includes instructions executable by the processing logic to send an alert to a network management system, wherein the alert indicates that the UHF white space frequency is populated by a signal having a potential to interfere with video traffic delivered via a video head-end of a video distribution network.

In another embodiment, a method of detecting potential video traffic interference at a video head-end of a video distribution network is disclosed and includes detecting, at a video head-end, a signal populating an ultra high frequency (UHF) white space frequency. The method also includes determining that a strength of the signal is equal to or greater than a threshold signal strength. Further, the method includes sending an alert from the video head-end to a network management system. The alert indicates that the UHF white space frequency is populated by a signal having a potential to interfere with video traffic delivered via the video head-end.

In another embodiment, a method of detecting potential video traffic interference at a video operations center of a video distribution network is disclosed and includes receiving an alert at a network management system, where the alert indicates that a population of an ultra high frequency (UHF) white space frequency by a signal having a potential to interfere with video traffic has been detected at a video head-end of a video distribution network. The method also includes sending data to the video head-end, the data indicating at least one corrective measure to mitigate interference with the video traffic by the signal.

In another embodiment, a computer-readable medium is disclosed having processor-readable instructions executable by a processor to perform a method that includes determining that a strength of a detected signal populating an ultra high frequency (UHF) white space frequency is equal to or greater than a threshold signal strength, and sending an alert to a video operations center. The alert indicates that the UHF white space frequency is populated by a signal having a potential to interfere with video traffic delivered via a video head-end of a video distribution network.

Figure 1:
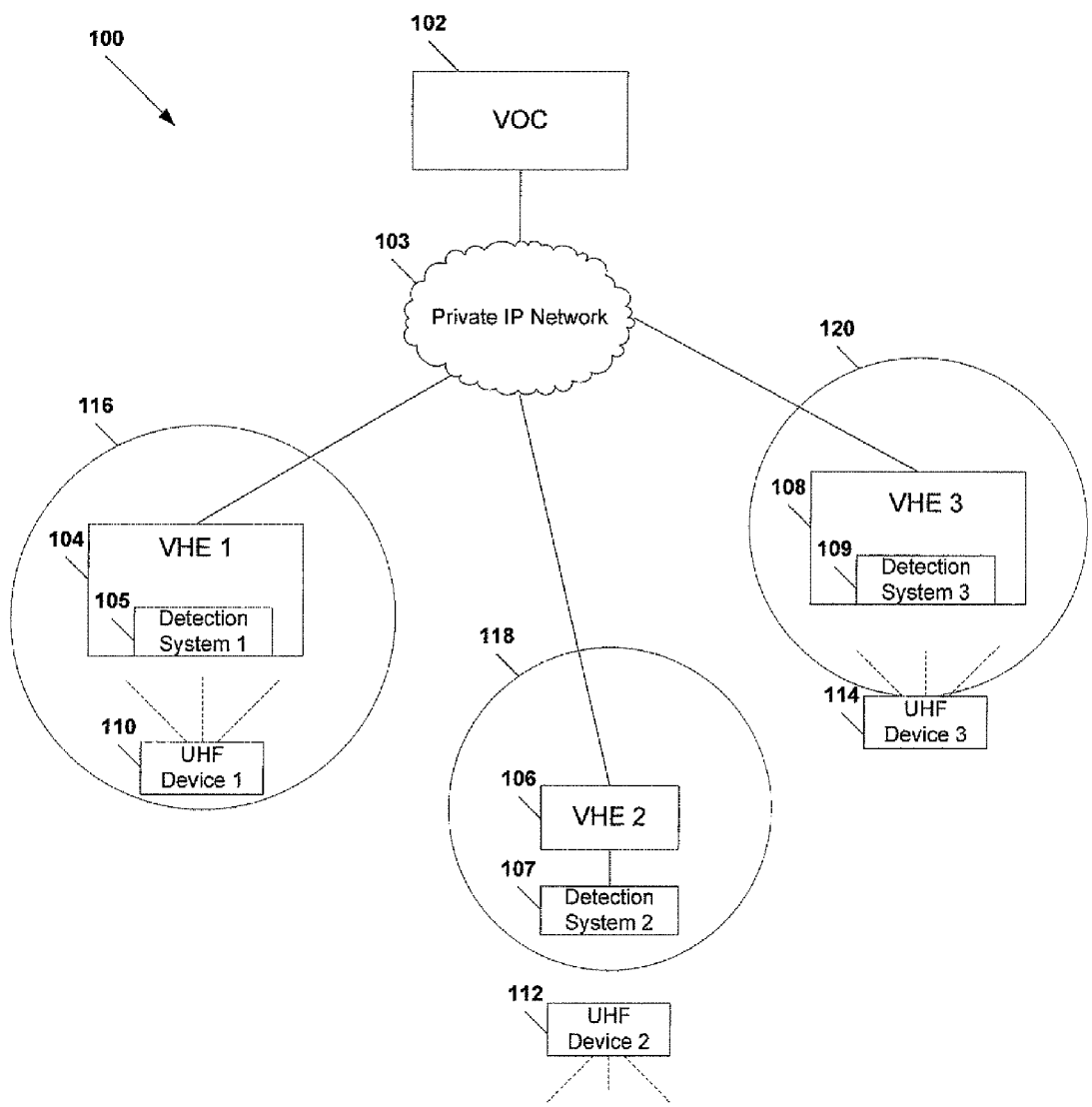
FIG. 1 is a block diagram of a particular embodiment of a system to detect potential video traffic interference.

Referring to FIG. 1, a particular embodiment of a system to detect potential video traffic interference is illustrated and designated generally at 100. The system 100 includes a video operations center (VOC) 102 of a video distribution network, such as a video super head-end. The VOC 102 communicates with a plurality of video head-ends 104-108 via a private data network, such as the private Internet Protocol (IP) network 103. In an illustrative embodiment, each of the video head-ends (VHEs) 104-108 is adapted to deliver video content (e.g., IP Television or other digital television content) to a plurality of client devices, such as client devices within a geographic region.

Further, the system 100 includes a plurality of detection systems, such as the detection systems 105, 107 and 109. In one embodiment, a detection system can be included within a video head-end. For instance, a first detection system 105 can be included within a first video head-end 104. In another embodiment, a detection system can communicate with a video head-end. For example, a second detection system 107 can be included within a second video head-end 106.

Each detection system can include a cognitive radio device or other device or system that is adapted to scan a plurality of ultra high frequency (UHF) white space frequencies within a pre-defined area about an associated video head-end. UHF white space frequencies include unused UHF frequencies in the radio portion of the electro-magnetic spectrum, such as unused frequencies between 300 KHz and 1 GHz. In an illustrative, non-limiting embodiment, the UHF white space frequencies can include unused frequencies between 300 MHz and 698 MHz. The first detection system 105 can be adapted to scan UHF white space frequencies within a first pre-defined area 116. Further, the second detection system 107 can be adapted to scan UHF white space frequencies within a second pre-defined area 118. In addition, the third detection system 109 can be adapted to scan UHF white space frequencies within a third pre-defined area 120. The pre-defined areas 116, 118 and 120, can be of different sizes, of substantially similar sizes, or any combination thereof.

Each pre-defined area defines an area about a video head-end, in which emission of signals via a UHF white space frequency can cause interference with video traffic delivered via the video head-end. For instance, emission of signals having a threshold strength via a UHF frequency that is adjacent to, or within a pre-defined range of, a channel used to transmit television programming via the video head-ends can cause video and audio disruptions such as pixilation, freezing, other quality of service degradations, or any combination thereof.

Each detection system is adapted to detect a signal populating a UHF white space frequency within the pre-defined area about an associated video head-end. For example, the first detection system 105 can be adapted to detect emission of a signal via a UHF white space frequency, by a first UHF device 110 whose signal is within the first pre-defined area 116. Similarly, the third detection system 109 can be adapted to detect emission of a signal via a UHF white space frequency, by a third UHF device 114 whose signal is within the third pre-defined area 120 (even though the UHF device may not be within the pre-defined area 120). In contrast, the second detection system 107 may not detect emission of a signal via a UHF white space frequency, by a second UHF device 112 whose signal is outside the second pre-defined area 118. The UHF devices 110, 112 and 114 can include, for example, wireless regional area network (WRAN) devices emitting IEEE 802.22 signals, set-top box devices, portable computing devices, HAM radios, CB radio devices, other current devices that are adapted or modified to emit signals via UHF white space frequencies, other future devices that are adapted or modified to emit signals via UHF white space frequencies, or any combination thereof.

In addition, each detection system is adapted to determine whether a signal populating a UHF white space frequency within a pre-defined area about an associated video head-end has a signal strength that is greater than or equal to a threshold signal strength. For example, the threshold signal strength can be 6-10 decibels isotropic (dBi). In an illustrative, non-limiting embodiment, the threshold signal strength can be 8 dBi. The threshold signal strength can be configurable at each video head-end. In one example, the first detection system 105 may be adapted to determine that the signal emitted by the first UHF device 110 is of sufficient strength to potentially interfere with video traffic delivered via the first video head-end 104. Whereas, the third detection system 109 may be adapted to determine that the signal emitted by the third UHF device 114 is not of sufficient strength to potentially interfere with video traffic delivered via the third video head-end 108. Threshold signal strengths corresponding to potential for interference at each video head-end can be different, substantially similar, or any combination thereof.

Further, each detection system is adapted to identify a UHF white space frequency populated by a signal within a pre-defined area about an associated video head-end facility. In one embodiment, a detection system can be adapted to identify a populated UHF white space frequency when the signal is greater than or equal to a threshold signal strength. In other embodiments, a detection system can be adapted to always identify a populated UHF white space frequency. Each detection system can be adapted to compare the identified UHF white space frequency with data related to a specific group of UHF white space frequencies stored at the detection system, where signals within the specific group of UHF white space frequencies and having the threshold signal strength have a potential to interfere with video traffic delivered via the associated video head-end.

Each detection system is adapted to send an alert to a network management system at the VOC 102, when a signal having a potential to interfere with video traffic delivered via an associated video head-end is detected. In one embodiment the alert can be a simple network management protocol (SNMP) alarm. The alert can indicate that such a signal has been detected. In one embodiment, the alert can also identify the populated UHF white space frequency, one or more affected channels used to deliver video content via the video head-end, the signal strength, other data, or any combination thereof.

In a particular embodiment, each detection system can be adapted to store data indicating a status of each of the plurality of UHF white space frequency scanned by the detection system. For example, upon detecting a signal populating a UHF white space frequency, where the signal has a potential to interfere with video traffic delivered via a video head-end, a detection system can store data indicating that the UHF white space frequency is populated. In a particular embodiment, each detection system can be adapted to detect when a populated UHF white space frequency is depopulated and to store data indicating that the UHF white space frequency is not populated. Further, each detection system can be adapted to send an alert to the VOC 102 indicating the depopulation.

The VOC 102 is adapted to receive an alert from a detection system associated with a video head-end indicating that a UHF white space frequency has been populated by a signal having a potential to interfere with video traffic delivered via the video head-end. In a particular embodiment, the VOC is adapted to send data to the video head-end indicating one or more corrective measures to mitigate interference or potential interference at the video head-end.

Figure 2:
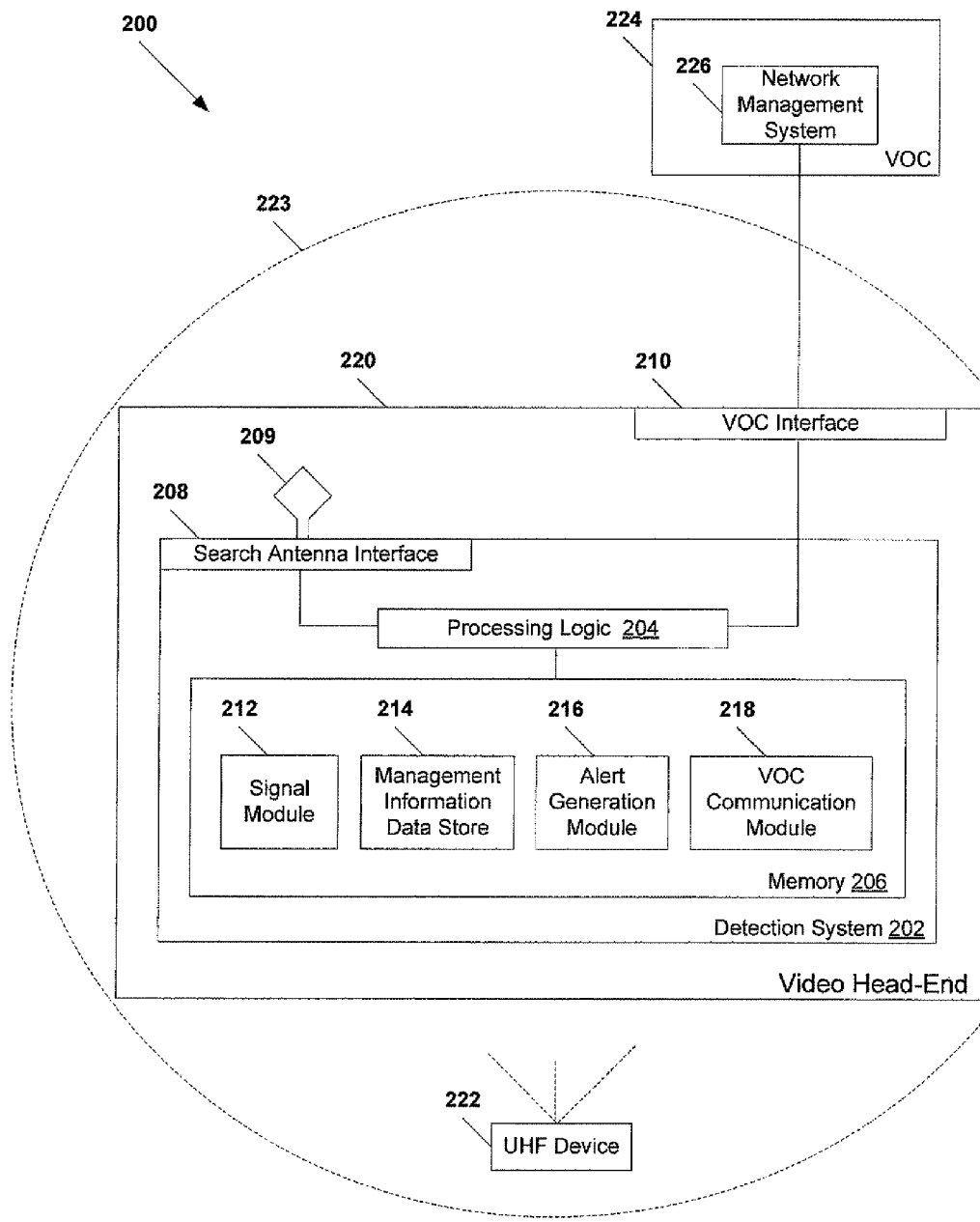
FIG. 2 is a block diagram of a second particular embodiment of a system to detect potential video traffic interference.

Referring to FIG. 2, a second particular embodiment of a system to detect potential video traffic interference is illustrated and designated generally 200. The system 200 includes a detection system 202 included within a video head-end (VHF) 220 of a video distribution network. The system 200 also includes a video operations center (VOC) 224 that communicates with the detection system 202 via a VOC interface 210.

In a particular embodiment, the detection system 202 includes processing logic 204 and memory 206 accessible to the processing logic 204. In an illustrative embodiment, the processing logic 204 can communicate with a search antenna 209 via a search antenna interface 208. The memory 206 includes a plurality of modules 212-218 that are adapted to provide various functions of the detection system 202 with respect to detecting potential video traffic interference. The modules 212-218 can include data stores; hardware logic; instructions executable by the processing logic 204, such as instructions included in one or more computer programs or operating systems; or any combination thereof.

For example, the memory 206 can include a signal module 212 that is executable by the processing logic 204 to scan a plurality of ultra high frequency (UHF) white space frequencies within a pre-defined area 223 about the video head-end 220. Further, the signal module 212 is executable by the processing logic 204 to detect a signal populating one of the plurality of UHF white space frequencies within the pre-defined area 223. In addition, the signal module 212 is executable by the processing logic 204 to determine whether a signal populating one of the plurality of UHF white space frequencies within the pre-defined area 223 has a signal strength that is greater than or equal to a threshold signal strength.

In a particular embodiment, the signal module 212 can be executable by the processing logic 204 to identify a UHF white space frequency populated by a detected signal. Moreover, the signal module 212 can be executable by the processing logic 204 to compare the identified UHF white space frequency to a specific group of UHF white space frequencies, within which signals having the threshold signal strength have a potential to interfere with video traffic delivered via the associated video head-end. Data related to the specific group of UHF white space frequencies can be stored at a management information data store 214.

The memory includes an alert generation module 216 that is executable by the processing logic 204 to generate an alert to be sent to a network management system 226 at the VOC 224, when a signal having a potential to interfere with video traffic delivered via the video head-end 220 is detected. In one embodiment, the alert can be a simple network management protocol (SNMP) alarm. The alert can indicate that such a signal has been detected. In one embodiment, the alert can also identify the populated UHF white space frequency, one or more affected channels used to deliver video content via the video head-end, the signal strength, other data, or any combination thereof. The memory can include a VOC communication module 218 that is executable by the processing logic 204 to send the alert to the VOC 224 via the VOC interface 210.

In a particular embodiment, the management information data store 214 can store data indicating a status of each of the plurality of UHF white space frequencies scanned by the detection system 202. For example, upon detecting a signal populating a UHF white space frequency, where the signal has a potential to interfere with video traffic delivered via a video head-end, a detection system can store data indicating that the UHF white space frequency is populated. In a particular embodiment, the signal module 212 can be executable by the processing logic 204 to detect when a UHF white space frequency is depopulated, and the management information data store 214 can store data indicating that the UHF white space frequency is not populated. Further, the alert generation module 216 can be executable by the processing logic 204 to generate a second alert to be sent to the VOC 224 indicating the depopulation.

The VOC 224 includes a network management system adapted to receive an alert from the detection system 202 indicating that a UHF white space frequency has been populated by a signal having a potential to interfere with video traffic delivered by a video distribution network via the video head-end 220. In a particular embodiment, the network management system can be adapted to output data indicating the population of the UHF white space frequency to a network administrator or other user at the VOC 224.

In an illustrative embodiment, the network management system 226 is adapted to receive input indicating one or more corrective measures to mitigate the potential interference. For example, engineers or other parties at the VOC 224 can inspect frequencies corresponding to potentially affected channels used to deliver the video traffic via the video head-end 220, as well as adjacent channels and channels within a pre-defined range of potentially affected channels, for interference and determine one or more corrective measures to mitigate such interference or potential interference. The administrator or other user can input data related to the determined corrective measure(s) to the network management system 226. The network management system 226 is adapted to send data related to the corrective measure(s) to the video head-end associated with the detection system.

Figure 3:
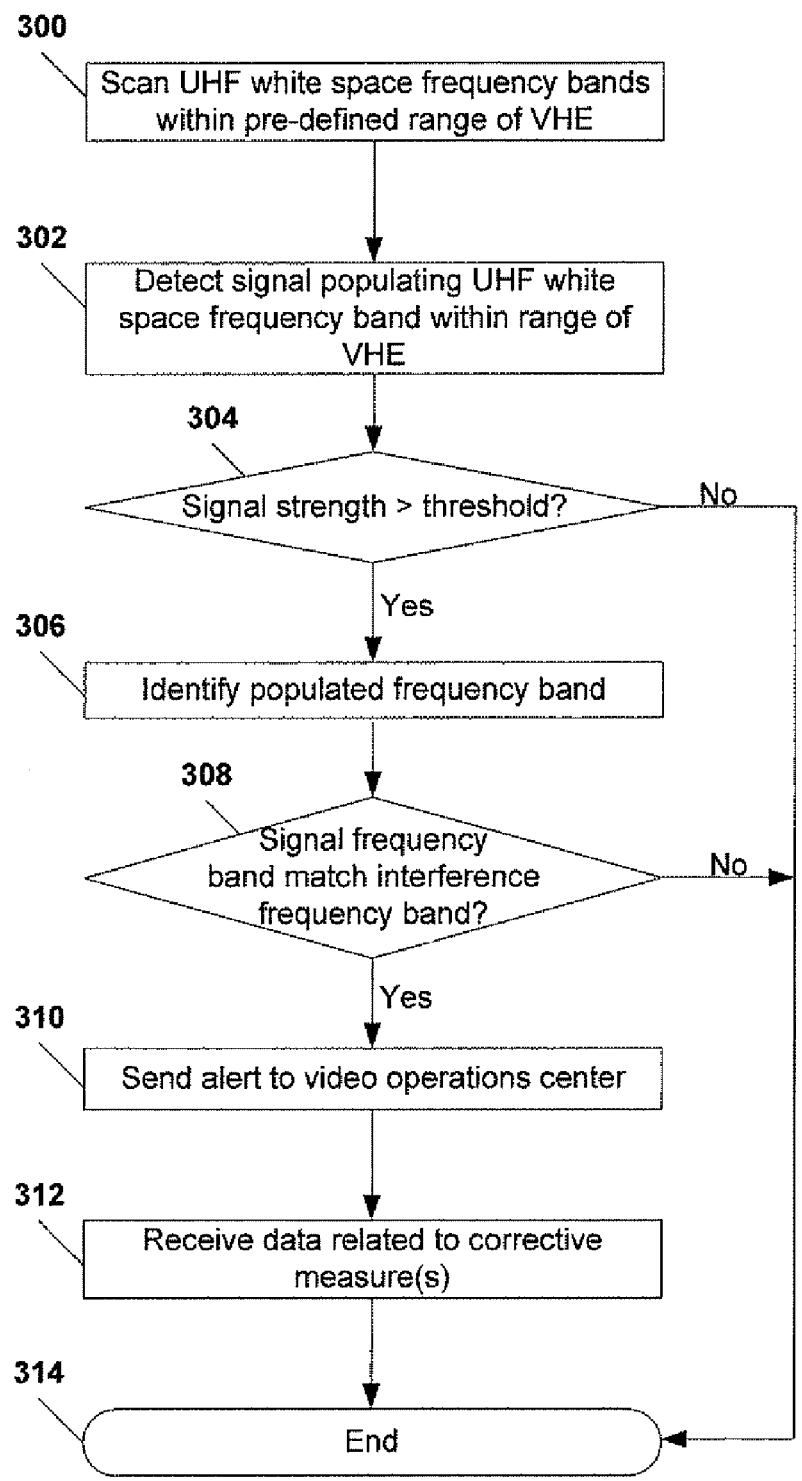
FIG. 3 is a flow diagram of a particular embodiment of a method of detecting potential video traffic interference.

Referring to FIG. 3, a particular embodiment of a method of detecting potential video traffic interference is illustrated. At block 300, a detection system associated with a video head-end of a video distribution network scans a plurality of ultra high frequency (UHF) white space frequencies within a pre-defined area about the video head-end. Moving to block 302, the detection system detects a signal populating a UHF white space frequency within the pre-defined area about the video head-end. The UHF devices can include, for example, wireless regional area network (WRAN) devices emitting IEEE 802.22 signals, HAM radios, CB radio devices, other devices adapted or modified to emit signals via UHF white space frequencies, or any combination thereof.

Proceeding to decision node 304, the detection system determines whether the detected signal has a signal strength that is greater than or equal to a threshold signal strength. If the signal does not have a signal strength that is greater than or equal to the threshold signal strength, the method can terminate at 312. Conversely, if the signal has a signal strength that is greater than or equal to the threshold signal strength, the method continues to block 306, and the detection system identifies the UHF white space frequency populated by the detected signal. Advancing to block 308, the detection system determines whether the identified UHF white space frequency matches one of a plurality of frequencies on which signals can potentially interfere with video traffic (including video, audio, or any combination thereof) delivered via the video head-end.

For instance, the detection system can determine that the detected signal has populated a frequency adjacent to a channel used to deliver the video traffic or a frequency within a pre-defined range of such a channel. In an illustrative embodiment, the detection system can compare the identified UHF white space frequency with data related to a specific group of UHF white space frequencies stored at the detection system, where signals within the specific group of UHF white space frequencies and having the threshold signal strength have a potential to interfere with video traffic delivered via the associated video head-end.

If the detection system determines that the detected signal has populated one of a plurality of frequencies on which signals can potentially interfere with video traffic, the method moves to block 310, and the detection system sends an alert to a video operations center (VOC) of the video distribution network. In one embodiment, the alert can be a simple network management protocol (SNMP) alarm. The alert can indicate that such a signal has been detected. In one embodiment, the alert can also identify the populated UHF white space frequency, one or more affected channels used to deliver video content via the video head-end, the signal strength, other data, or any combination thereof. In a particular embodiment at block 312, the detection system can receive data from the VOC indicating one or more corrective measures to mitigate the potential interference. The method terminates at 314.

Figure 4:
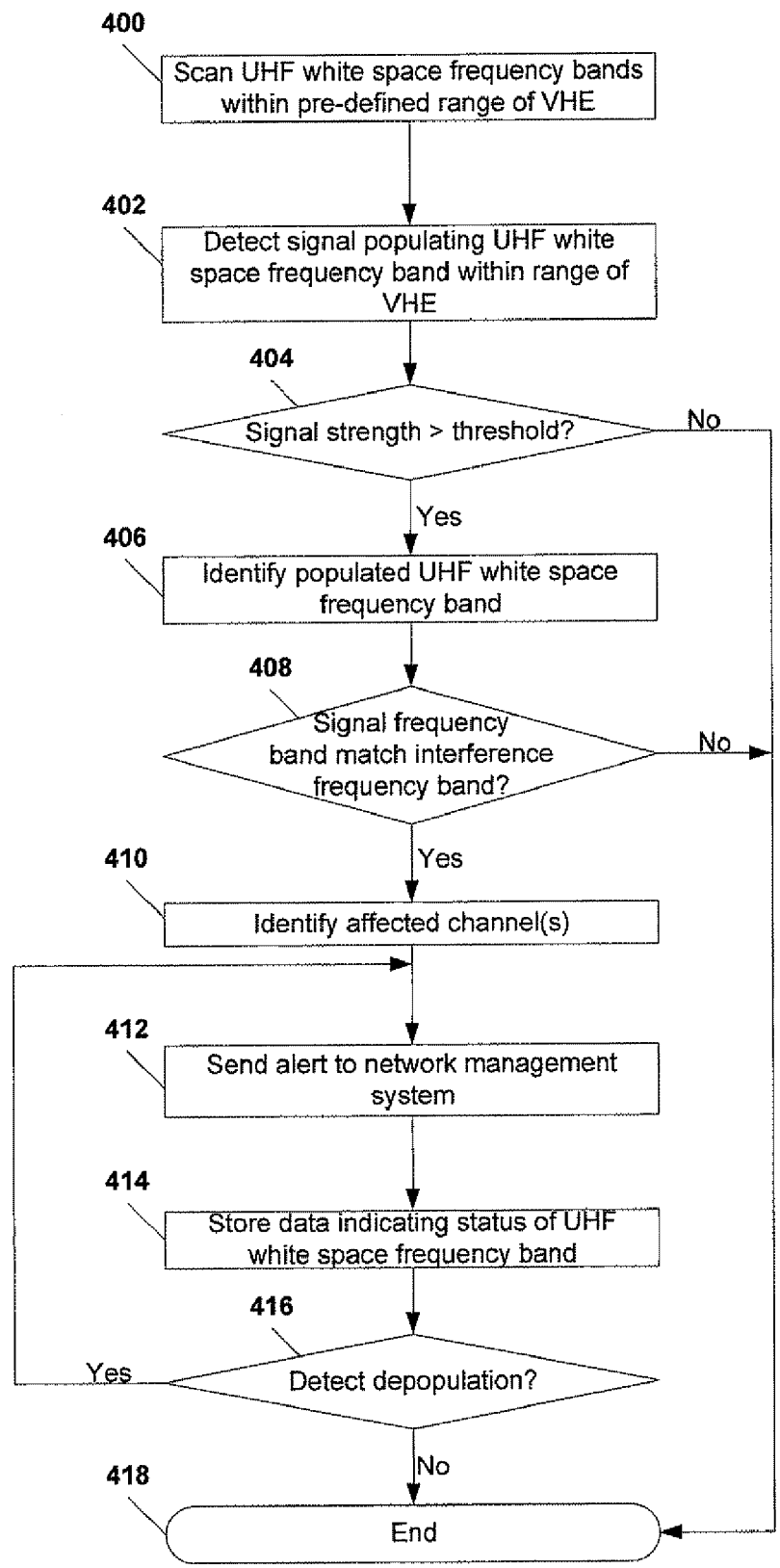
FIG. 4 is a flow diagram of a second particular embodiment of a method of detecting potential video traffic interference.

Referring to FIG. 4, a second particular embodiment of a method of detecting potential video traffic interference is illustrated. At block 400, a detection system associated with a video head-end of a video distribution network scans a plurality of ultra high frequency (UHF) white space frequencies within a pre-defined area about the video head-end. Moving to block 402, the detection system detects a signal populating a UHF white space frequency within the pre-defined area about the video head-end. Proceeding to decision node 404, the detection system determines whether the detected signal has a signal strength that is greater than or equal to a threshold signal strength. If the signal does not have a signal strength that is greater than or equal to the threshold signal strength, the method can terminate at 412.

Conversely, if the signal has a signal strength that is greater than or equal to the threshold signal strength, the method continues to block 406, and the detection system identifies the UHF white space frequency populated by the detected signal. Advancing to block 408, the detection system determines whether the identified UHF white space frequency matches one of a plurality of frequencies on which signals can potentially interfere with video traffic (including video, audio, or any combination thereof) delivered via the video head-end. For instance, the detection system can determine that the detected signal has populated a frequency adjacent to a channel used to deliver the video traffic or a frequency within a pre-defined range of such a channel.

If the detection system determines that the detected signal has populated one of a plurality of frequencies on which signals can potentially interfere with video traffic, the method moves to block 410, and the detection system identifies one or more channels used to deliver video traffic via the video head-end, which are affected or have the potential to be affected by interference from the detected signal. Proceeding to block 412, the detection system sends an alert to a video operations center (VOC) of the video distribution network. In one embodiment, the alert can be a simple network management protocol (SNMP) alarm. The alert can indicate that such a signal has been detected. In one embodiment, the alert can also identify the populated UHF white space frequency, one or more affected channels used to deliver video content via the video head-end, the signal strength, other data, or any combination thereof.

In a particular embodiment, at block 412, the detection system stores data indicating a status of the UHF white space frequency populated by the detected signal. Further, at decision node 416, the detection system can determine whether it detects a depopulation of a previously populated UHF white space frequency. If so, the method can return to block 412, and the detection system can send an alert to the VOC indicating the depopulation and store data indicating a status of the depopulated UHF white space frequency. The method terminates at 418.

Figure 5:
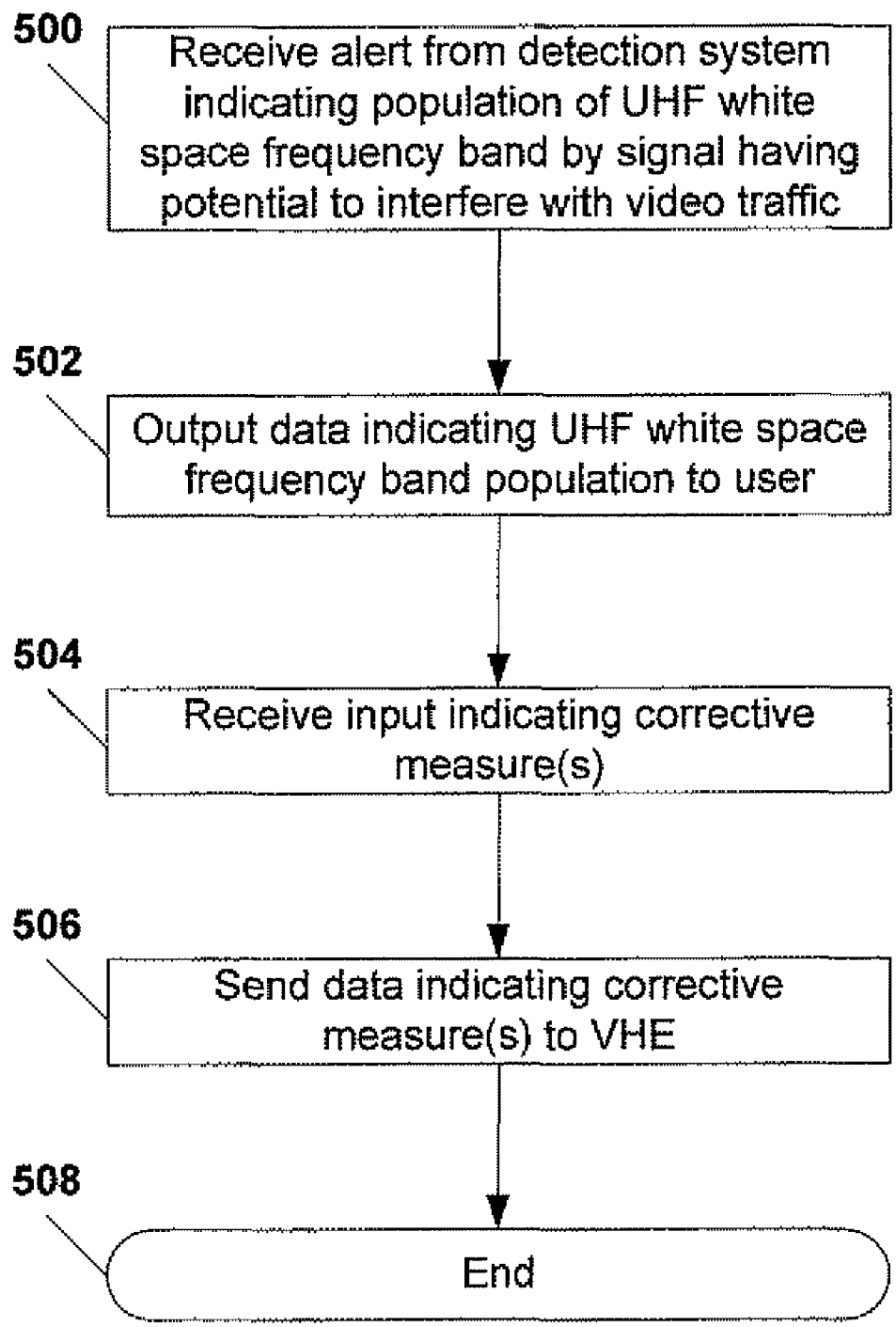
FIG. 5 is a flow diagram of a third particular embodiment of a method of detecting potential video traffic interference.

Referring to FIG. 5, a third particular embodiment of a method of detecting potential video traffic interference is illustrated. At block 500, a network management system receives an alert from a detection system associated with a video head-end indicating that a UHF white space frequency has been populated by a signal having a potential to interfere with video traffic delivered by a video distribution network via the video head-end. The detection system can be coupled to or integrated with the video head-end. Moving to block 502, the network management system outputs data indicating the population of the UHF white space frequency to a network administrator or other user.

Proceeding to block 504, the network management system receives input indicating one or more corrective measures to mitigate the potential interference. For example, engineers or other parties at a video operations center can inspect frequencies corresponding to potentially affected channels used to deliver the video traffic via the video head-end, as well as adjacent channels and channels within a pre-defined range of potentially affected channels, for interference and determine one or more corrective measures to mitigate such interference or potential interference. The administrator or other user can input data related to the determined corrective measure(s) to the network management system. Continuing to block 506, the network management system sends data related to the corrective measure(s) to the video head-end associated with the detection system. The method terminates at 508.

In some embodiments, the methods disclosed herein can be performed as described. In alternative embodiments, aspects of the methods can be performed in alternative sequences or simultaneously. For example, a detection system can store a status of a populated UHF white space frequency even if a detected signal does not have a threshold signal strength.

In conjunction with the configurations and structures disclosed herein, a system and method of detecting potential video traffic interference are provided, in which signals populating UHF white space frequencies are detected. Signals of sufficient strength, which populate certain UHF white space frequencies, can interfere with digital television video traffic and other video traffic delivered via an Internet Protocol Television (IPTV) network and other video distribution networks. For example, tuners and other receiving devices at video head-end facilities can experience cross-channel interference, co-channel interference, other types of interference, or any combination thereof, as a result of signals competing with video traffic signals for certain frequencies at the receiving devices. A signal strength (e.g., amplitude) of a detected signal populating a UHF white space frequency can be determined, and an alert can be sent to a network management system when the detected signal has a strength sufficient to potentially interfere with video traffic at the video head-end. In a particular embodiment, the network management system can send data indicating one or more corrective measures to the video head-end office. Examples of corrective measures include feeding video traffic to a geographic area or subscriber group from a video head-end at a location that is not susceptible to interference from the detected signal; altering a direction of a directional receiving antenna at the video head-end; and other measures that can be undertaken to mitigate interference from a detected signal.

Figure 6:
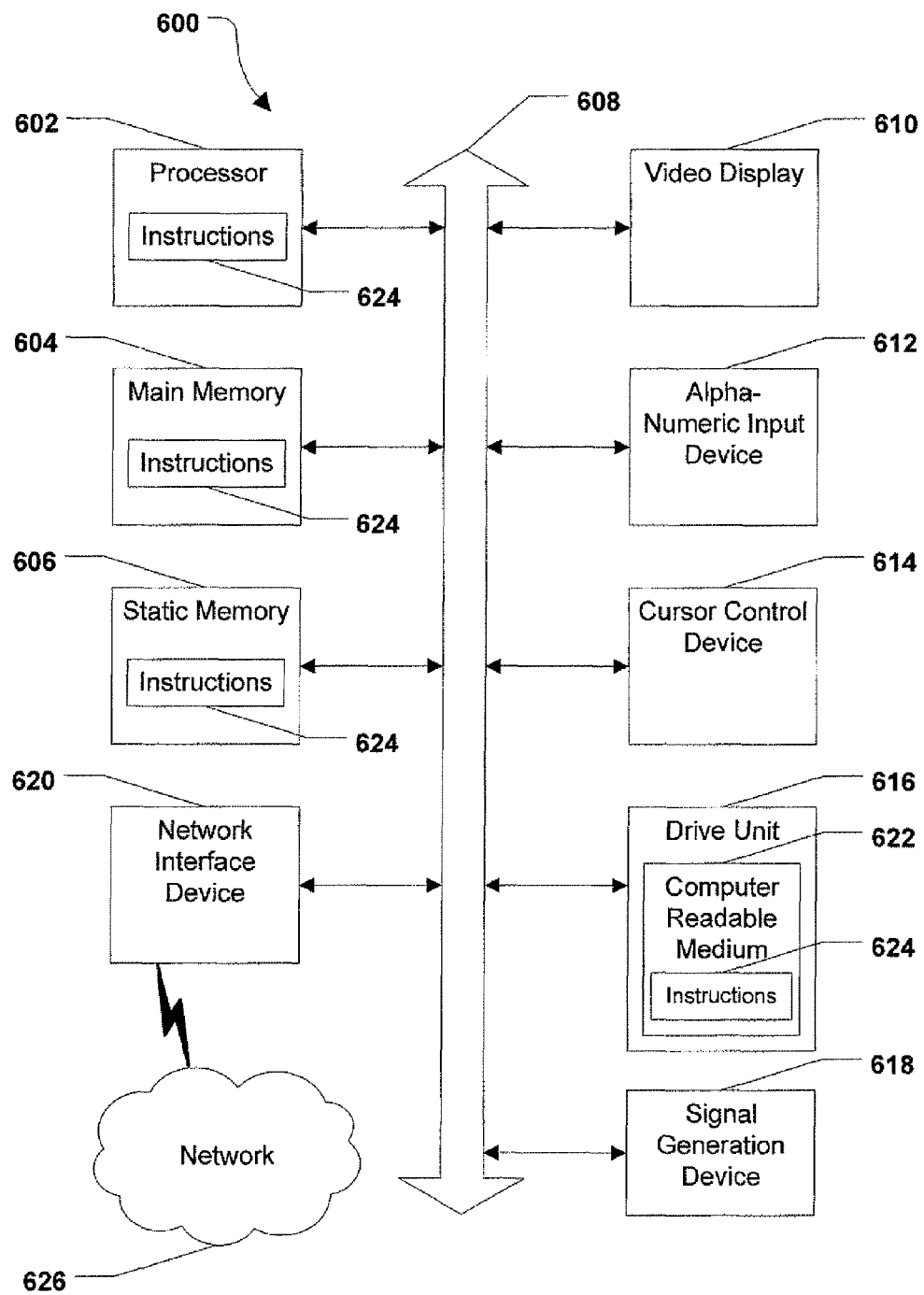
FIG. 6 is a block diagram of an illustrative embodiment of a general computer system.

Referring to FIG. 6, an illustrative embodiment of a general computer system is shown and is designated 600. The computer system 600 can include a set of instructions that can be executed to cause the computer system 600 to perform any one or more of the methods or computer based functions disclosed herein. The computer system 600 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 600 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 600 can be implemented using electronic devices that provide voice, video or data communication. Further, while a single computer system 600 is illustrated, the term "system" shall also be taken to include any collection of systems or sub-systems that individually or jointly execute a set, or multiple sets, of instructions to perform one or more computer functions.

As illustrated in FIG. 6, the computer system 600 may include a processor 602, e.g., a central processing unit (CPU), a graphics processing unit (GPU), or both. Moreover, the computer system 600 can include a main memory 604 and a static memory 606, which can communicate with each other via a bus 608. As shown, the computer system 600 may further include a video display unit 610, such as a liquid crystal display (LCD), an organic light emitting diode (OLED), a flat panel display, a solid state display, or a cathode ray tube (CRT). Additionally, the computer system 600 may include an input device 612, such as a keyboard, and a cursor control device 614, such as a mouse. The computer system 600 can also include a disk drive unit 616, a signal generation device 618, such as a speaker or remote control, and a network interface device 620.

In a particular embodiment, as depicted in FIG. 6, the disk drive unit 616 may include a computer-readable medium 622 in which one or more sets of instructions 624, e.g. software, can be embedded. Further, the instructions 624 may embody one or more of the methods or logic as described herein. In a particular embodiment the instructions 624 may reside completely, or at least partially, within the main memory 604, the static memory 606, and/or within the processor 602 during execution by the computer system 600. The main memory 604 and the processor 602 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 624 or receives and executes instructions 624 responsive to a propagated signal, so that a device connected to a network 626 can communicate voice, video or data over the network 626. Further, the instructions 624 may be transmitted or received over the network 626 via the network interface device 620.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the disclosed embodiments are not limited to such standards and protocols. For example, standards for Internet and other packet switched network transmission (e.g., TCP/IP, DP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments that fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of detecting potential video traffic interference at a video head-end of a video distribution network, the method comprising:
   detecting, at a video head-end, a signal populating an ultra high frequency (UHF) white space frequency;
   determining that a strength of the signal is equal to or greater than a threshold signal strength; and
   sending an alert from the video head-end to a network management system, wherein the alert indicates that the UHF white space frequency is populated by a signal having a potential to interfere with video traffic delivered via the video head-end.

2. The method of claim 1, further comprising scanning a plurality of white space frequencies within a pre-defined area about the video head-end.

3. The method of claim 1, further comprising identifying the populated UHF white space frequency, wherein the alert indicates the identified frequency.

4. The method of claim 1, further comprising determining that the populated UHF white space frequency is one of a plurality of UHF white space frequencies, each of whose population has a potential to interfere with video traffic at the video head-end.

5. The method of claim 4, wherein the populated UHF white space frequency includes a frequency that is within a pre-defined range of a frequency associated with a video content channel, wherein the video head-end delivers video traffic via the video content channel.

6. The method of claim 5, wherein the populated UHF white space frequency includes a frequency that is adjacent to the frequency associated with the video content channel.

7. The method of claim 5, wherein the alert identifies the video content channel.

8. The method of claim 1, further comprising storing data indicating that the UHF white space frequency is populated.

9. The method of claim 1, further comprising receiving data from the network management system, the data indicating at least one corrective measure to mitigate interference with the video traffic by the detected signal.

10. A system to detect potential video traffic interference at a video head-end of a video distribution network, the system comprising:
    a detection system having processing logic and memory accessible to the processing logic, wherein the memory includes instructions executable by the processing logic to:
       determine that a strength of a detected signal populating an ultra high frequency (UHF) white space frequency is equal to or greater than a threshold signal strength; and
       send an alert to a network management system, wherein the alert indicates that the UHF white space frequency is populated by a signal having a potential to interfere with video traffic delivered via a video head-end of a video distribution network.

11. The system of claim 10, wherein the detection system is adapted to detect the signal via a search antenna.

12. The system of claim 10, wherein the memory includes a management information data store and wherein the memory includes instructions executable by the processing logic to identify the populated UHF white space frequency and to determine that the populated UHF white space frequency is one of a plurality of UHF white space frequencies stored at the management information data store, wherein population of each of the plurality of UHF white space frequencies has a potential to interfere with video traffic at the video head-end.

13. The system of claim 12, wherein the memory includes instructions executable by the processing logic to store a status of the UHF white space frequency at the management information data store.

14. The system of claim 10, wherein the alert is a simple network management protocol (SNW) alarm.

15. The system of claim 10, wherein the threshold signal strength is equivalent to between 6 decibels isotropic (dBi) and 10 dBi.

16. The system of claim 10, wherein the signal is an IEEE 802.22 wireless regional access network signal.

17. The system of claim 10, wherein the video traffic includes digital television video traffic and wherein the signal has the potential to cause video, audio, or any combination thereof associated with the digital television video traffic to pixilate, freeze, or a combination thereof.

18. A non-transitory computer-readable medium having processor-readable instructions executable by a processor to perform a method, the method comprising:
    determining that a strength of a detected signal populating an ultra high frequency (UHF) white space frequency is equal to or greater than a threshold signal strength; and
    sending an alert to a video operations center, wherein the alert indicates that the UHF white space frequency is populated by a signal having a potential to interfere with video traffic delivered via a video head-end of a video distribution network.

19. The non-transitory computer-readable medium of claim 18, wherein the method further comprises detecting the signal.

20. The non-transitory computer-readable medium of claim 18, wherein the method further comprises receiving data indicating at least one corrective measure from the video operations center.

21. The non-transitory computer-readable medium of claim 18, wherein the method further comprises detecting a depopulation of a frequency of the UHF white space frequency and sending a second alert to the video operations center, wherein the second alert indicates depopulation of the frequency.

22. The non-transitory computer-readable medium of claim 21, wherein the method further comprises updating data stored at the video head-end indicating a status of at least one frequency associated with the UHF white space frequency.

* * * * *